(12) United States Patent
Hagenauer et al.

(10) Patent No.: US 6,925,107 B2
(45) Date of Patent: *Aug. 2, 2005

(54) DECODING METHOD AND DECODING DEVICE FOR A CDMA TRANSMISSION SYSTEM FOR DEMODULATING A RECEIVED SIGNAL AVAILABLE IN SERIAL CODE CONCATENATION

(75) Inventors: Joachim Hagenauer, Seefeld (DE); Rupert Herzog, Eiselfing (DE); Andreas Schmidbauer, Munich (DE)

(73) Assignee: Deutsche Telekom AG, Bonn (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/043,710

(22) Filed: Jan. 9, 2002

(65) Prior Publication Data

US 2002/0097818 A1 Jul. 25, 2002

Related U.S. Application Data

(62) Division of application No. 09/036,207, filed on Mar. 6, 1998.

(51) Int. Cl.[7] .................................................. H04B 1/69
(52) U.S. Cl. ........................................ 375/147; 375/341
(58) Field of Search ................................ 375/130, 140, 375/147–153, 316, 317, 324, 340–341, 136, 146

(56) References Cited

U.S. PATENT DOCUMENTS 6,377,610 B1 * 4/2002 Hagenauer et al. ......... 375/136

OTHER PUBLICATIONS

Hagenauer, Forward Error Correcting for CDMA Systems, Technical University of Munich, 1996, pp 566–569.*
Hagenauer et al, Iterative Decoding of Binary Block and Convolutional Codes, IEEE, vol. 42, No. 2, Mar. 1996, 429–445.*

* cited by examiner

Primary Examiner—Kevin Burd
(74) Attorney, Agent, or Firm—Kenyon & Kenyon (57) ABSTRACT

A method and a device for decoding for use in a code-division multiple access (CDMA) transmission system for demodulating a received signal available in serial code concatenation, with a two-step coding being carried out at the transmitting end of the transmission system, including an orthogonal, multi-step inner Hadamard code and an outer, error-correcting code of a predefined rate. In the receiver, a soft-in/soft-out decoder is provided, at whose input and output soft values are processed as reliability information, i.e., L-values. The soft output of the first decoder step, or inner code is the soft input for the decoder step, or outer code, that follows in each case, the first decoder step receiving the output values of the preceding demodulation, which contain the channel's reliability information. A soft output is used by the decoder, in particular a MAP decoder, as a-priori information for the systematic bits of the Walsh function of the inner code for decoding of the inner code.

4 Claims, 9 Drawing Sheets

DECODING METHOD AND DECODING DEVICE FOR A CDMA TRANSMISSION SYSTEM FOR DEMODULATING A RECEIVED SIGNAL AVAILABLE IN SERIAL CODE CONCATENATION

CROSS-REFERENCE TO PRIOR APPLICATION

This application is a divisional of U.S. patent application Ser. No. 09/036,207, filed Mar. 6, 1998.

FIELD OF THE INVENTION

The present invention relates to a decoding method for a CDMA (code-division multiple access) transmission system for demodulating a received signal available in serial code concatenation, a two-step coding being carried out at the transmitting end of the transmission system, including an orthogonal, multi-step modulation and an outer error-correcting code of a predefined rate.

RELATED TECHNOLOGY

Transmission systems having an inner code, namely orthogonal modulation using Walsh functions or rows of the Hadamard matrix as code words, and an outer code, for example a convolution, or hash, code with interleavers, or interleave factors, are known in decoding methods. One simple concept entails decoding the inner code in accordance with the "maximum likelihood" principle, and decoding the outer code using a Viterbi algorithm (soft-in, hard-decision out) (See Proakis, J.G. Digital Communications, 2nd edition, New York, McGraw-Hill, 1989).

The next, best step involves improving the decoding of the inner code and in employing a "symbol-by-symbol" MAP decoder (the decoding of the outer code remains unchanged thereby), the algorithms for this, both for a coherent receiving plan, as well as for an incoherent receiving plan, being generally known.

German Patent Document No. 39 10 739 C3 describes a method for generalizing the Viterbi algorithm and, for this purpose, a device for receiving signals transmitted via an interfered channel, where, in a incremental metrics unit (TMU), the transitional costs are generated, and summing, comparison, and selection processes are subsequently carried out, and the differential costs of two incoming paths are calculated.

In the Proc. IEEE International Conference on Communication (ICC), Geneva, Switzerland, pp. 1064–1070, May 1993, Berrou proposes decoding the parallel concatenated codes in an iterative process.

SUMMARY OF THE INVENTION

An object of the present invention is to provide a method for a CDMA transmission system for demodulating a received signal available in serial code concatenation in which an existing signal format may be decoded on the receiver side of the transmission system more efficiently and with less likelihood of bit errors than is possible with known methods heretofore, so that by using a downstream decoder circuit, the two-step, serially concatenated coding is decoded as optimally as possible and with the least possible outlay.

The present invention provides a decoding method for demodulating a received signal available in serial code concatenation in a code-division multiple access transmission system, a two-step coding being carried out at the transmitting end of the transmission system, a first step of the two-step coding including a Hadamard orthogonal multi-step inner code, a second step of the two-step coding including an outer error-correcting code of a predefined rate, the method including providing a soft-in/soft-out decoder in a receiver of the transmission system, a first decoder step of the soft-in/soft-out decoder including an inner decoder, a second decoder step of the soft-in/soft-out decoder including an outer decoder; and processing soft values as reliability information at an output and an input of the soft-in/soft-out decoder, a soft output of the inner decoder being a soft input for the outer decoder, a channel reliability information output from a preceding demodulation being an input for the inner decoder.

The present invention also provides a decoding device for demodulating a received signal available in serial code concatenation in a code-division multiple access transmission system, a two-step coding being carried out at the transmitting end of the transmission system, a first step of the two-step coding including a Hadamard orthogonal multi-step inner code, a second step of the two-step coding including an outer error-correcting code of a predefined rate, the device including a soft-in/soft-out decoder disposed in a receiver of the transmission system, a first decoder step of the soft-in/soft-out decoder including an inner decoder, a second decoder step of the soft-in/soft-out decoder including an outer decoder, soft values being processed as reliability information at an output and an input of the soft-in/soft-out decoder, a soft output of the inner decoder being a soft input for the outer decoder, a channel reliability information output from a preceding demodulation being an input for the inner decoder.

In the method according to the present invention, a soft-in/soft-out decoder is used in the receiver, at whose input and output, soft values are processed as reliability information (L values), the soft output of the first decoder step (inner code) being the soft input for the decoder step (outer code) that follows in each case, and the first decoder step receiving the output values of the preceding demodulation, which contains the channel's reliability information.

Thus, the methods of iterative decoding can advantageously be applied to a CDMA system having orthogonal modulation as an inner code and a convolution code (inclusive of interleavers) as an outer code, thus within a system having serial code concatenation.

At the core of iterative decoding is the decoding instruction for the inner code. In this context, the decoding instructions must be expanded to enable use of a-priori information about the symbols to be decoded. Moreover, the outer "hard decision" Viterbi decoder is replaced by a "soft decision" Viterbi algorithm, i.e., by a MAP algorithm having a "soft decision" output for the coded bits, to obtain the a-priori information for the renewed decoding.

In another embodiment of the method according to the present invention, a soft output is used by a decoder, in particular a MAP decoder, as a-priori information for the systematic bits of the Walsh function of the inner code for decoding of the same. To enhance the reliability of the decisions of the inner decoder, a feedback (iterative decoding) from the outer to the inner decoder can be performed at least once, and the decisions (extrinsic information) of the second, outer decoder about the systematic bits of the code words of the inner code, for example of the Walsh functions, can be fed back as a-priori information to the input of the first, inner decoder.

The a-priori information for the systematic bits of the code words of the inner code, for example of the Walsh functions, are likewise made available to the inner MAP decoder (maximally a posteriori) as reliability values in vector L(u), and the decoder supplies, as a result, the L-values for estimated symbols L(û), the amount |L(û$_k$)| of the L-values indicating the reliability of the decision and the operational sign(L(û$_k$) of the L-values representing the hard decision. In the coherent receiver structure, the inner MAP decoder calculates, starting from the input vector (L$_C$·y) having a specific reliability (L$_C$) and from the a-priori vector L(u), as a decoder result, the weighted decision (L-values, L(û$_k$)) for the estimated symbols, as well as the extrinsic term (L$_e$(û$_k$)) of the L-values.

In the coherent receiver structure, to decode the inner Hadamard code, the vector of a-priori values (L(u)) for the systematic bits is added to the vector of reliability values (L$_C$·y) from the channel and, after that, a fast Hadamard transformation (FHT) follows; subsequently, with the signals (vector w), the exponential functions are generated with ½·wj as an argument, after which, the elements of the result vector (z) for each symbol (û$_K$) to be decoded are added, divided and expressed logarithmically, according to the equation:

$$\ln \frac{\sum\limits_{j,u_k=+1}^{N-1} z_j}{\sum\limits_{j,u_k=-1}^{N-1} z_j} = \ln \frac{\sum\limits_{j,u_k=+1}^{N-1} \exp\left(\frac{1}{2}w_j\right)}{\sum\limits_{j,u_k=-1}^{N-1} \exp\left(\frac{1}{2}w_j\right)}$$

$$= \ln\left(\overbrace{\sum\limits_{j,u_k=+1}^{N-1} \exp\left(\frac{1}{2}w_j\right)}^{\text{Term 1}}\right) - \ln\left(\overbrace{\sum\limits_{j,u_k=-1}^{N-1} \exp\left(\frac{1}{2}w_j\right)}^{\text{Term 2}}\right)$$

$$\approx \ln\left(\max_{j,u_k=+1}\left[\exp\left(\frac{1}{2}w_j\right)\right]\right) - \ln\left(\max_{j,u_k=-1}\left[\exp\left(\frac{1}{2}w_j\right)\right]\right)$$

$$= \frac{1}{2}\max_{j,u_k=+1}[w_j] - \frac{1}{2}\max_{j,u_k=-1}[w_j].$$

The decoder result for bit (û$_k$) is made up of three terms, namely of the a-priori information [L(u$_k$)] about the bit to be decoded, of the channel information [L$_C$·y$_{sys(k)}$] about the bit to be decoded, as well as of the extrinsic information [L$_e$(û$_k$)], in which the channel and a-priori information of all other bits of vector (y) or of the transmitted Walsh function are combined.

In the incoherent receiver structure, the inner MAP decoder calculates, starting from the input vector (w) and the a-priori vector (L(u)), as a decoder result, the weighted decision (L-values, L(û$_k$) for the estimated symbols, as well as the extrinsic term (L$_e$(û$_k$)) of the L-values.

In the incoherent receiver, to decode the inner Hadamard codes, the a-priori information (L(u)), for example in the form of a-priori probabilities P(x$_j$) for the Walsh functions, enters into the decoder instruction, which is such that for each bit decision, multiplied into the summing of numerator or denominator of the term to be expressed logarithmically of each considered element of the decision vector (w), are three terms, since there are the a-priori probabilities P(x$_j$), the exponentiated vector element, as well as the modified Bessel function to the first type of power (L−1) with argument.

A device for implementing the method is characterized by a soft-in/soft-out decoder in the receiver, at whose input and output, soft values are processed as reliability information (L-values), the soft output of the first decoder step (inner code) being in each case the soft input for the subsequent decoder step (outer code), and the first decoder step receiving the output values of the preceding demodulation, which contains the reliability information of the channel. To enhance the reliability of the decisions of the inner decoder, a feedback (iterative decoding) from the outer to the inner decoder is performed at least once, the decisions (extrinsic information) of the second, outer decoder about the systematic bits of the code words of the inner code, for example of the Walsh functions, being fed back as a-priori information to the input of the first, inner decoder. In the process, a RAKE receiver can be arranged upstream from the first decoder step, which receives the output values of the preceding demodulation.

DETAILED DESCRIPTION

In a two-step decoding, the quality of the first decoder output is decisive for the performance of the entire system. For this reason, it is indispensable that the reliability values be processed at the input and output of the first decoder step, which is why a MAP decoder is used as a decoder, which is used as a-priori information for the systematic bits of the Walsh function of the inner code for decoding of the same. Thus, the decoder must be able to process so-called soft values (L values) at the input and output of the decoder.

Figure 1A:
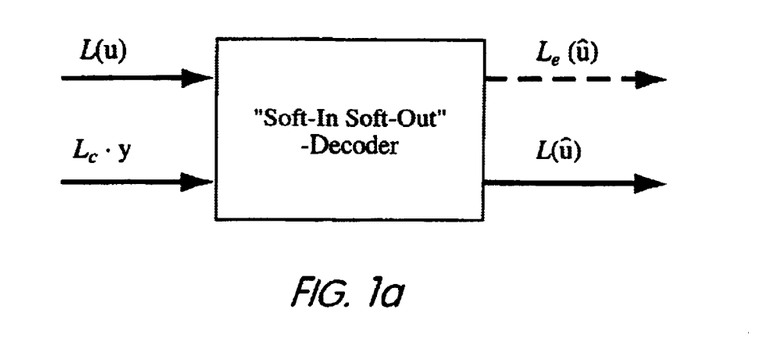
FIG. 1a shows a block diagram of a "soft-in/soft-out" decoder.
Figure 1B:
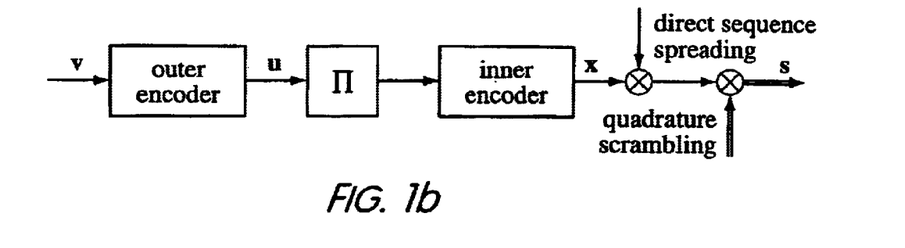
FIG. 1b shows a block diagram of a CDMA transmitter.

To further improve the decoding process, e.g., by feeding back the decisions of the second decoder step, the decoder of the first step is, moreover, to be expanded to include a-priori information about the receiving vector, or parts of the receiving vector in the decoding according to the block diagram of a "soft-in/soft-out" decoder according to FIG. 1. Thus, for iterative decoding, it is necessary to replace the outer Viterbi decoder with a modified soft-output Viterbi algorithm or with a MAP decoder, which supplies soft information for the coded bits. The soft output of the first decoder step is, in each case, the soft input for the subsequent Viterbi decoder with hard decisions at its output. As input values, denoted by the vector y, the first decoder step receives the integrated values after the long PN sequence is added.

Figure 2:
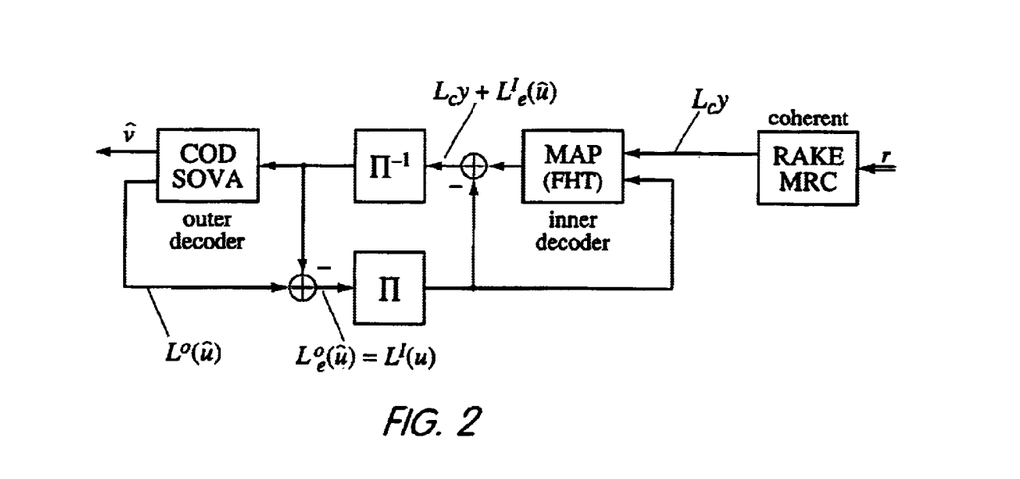
FIG. 2 shows a block diagram representation of the iterative decoding, and of the decoder structure with feedback for a coherent receiver.

At this point, the information of the outer decoder step is interleaved according to FIG. 2, and fed back as a-priori information for the second decoding of the inner code, which leads to a serial "turbo" decoding scheme; FIG. 2 shows a representation of the decoder structure, with feedback, for a coherent receiver, time-delay elements and memory elements having been omitted.

From a receiver, e.g., an L-finger RAKE receiver, one obtains the vector y of the length N for each transmitted Walsh function x having systematic bits $u_k$, k=0, ... K-1. The probability density function of each element of vector y is a Gaussian normal distribution having average values $E_S$ or $-E_S$ and the variance $$\sigma_n^2 = \sigma_{AWGN}^2 + \sigma_{MP}^2 + \sigma_{MUI}^2 \quad [1]$$

The first term in equation [1] describes the receiver noise; the second term is produced by the multi-path propagation; and the third term verifies the multi-user interferences of U other users. Assuming a perfect channel calculation, it is possible to analyze the reliability $$L_C = 2 \cdot \frac{Es}{\sigma_n^2}$$

of the received vector elements.

Using logarithmic likelihood algebra, the MAP decoder for this block code, inner code, is expressed by the following equation:

$$L^1(\hat{u}_k) = \ln \frac{\sum_{x \in C^1, uk=+1} P(x|y)}{\sum_{x \in C^1, uk=-1} P(x|y)} \quad [2]$$

$$= \ln \frac{\sum_{x \in C^1, uk=+1} \exp\left(\frac{1}{2}\sum_{i=0}^{N-1} L(x_i; y_i) \cdot x_i\right)}{\sum_{x \in C^1, uk=-1} \exp\left(\frac{1}{2}\sum_{i=0}^{N-1} L(x_i; y_i) \cdot x_i\right)}$$

The values:

$$L(xi, yi) = \begin{cases} Le \cdot y_i + L^I(Ui); \text{ for } i = \frac{1}{2^{k+1}}N; k=0,\ldots,K- \\ Le \cdot y; \text{ otherwise} \end{cases} \quad [3]$$

describe the probability of all elements of the resulting vector, the probability being supplemented by input vector y with probability $L_c$ by the a-priori information $L^I(u_i)$ for the K systematic bits according to the first line in equation [3] of code word $X \in C^1$, when available according to FIG. 2. The arguments of the exponential function exp( ... ) in equation [2] are results of the correlation of the resulting vector with all Walsh functions $x_j$, j=0, ... , N−1. This correlation operation for all code words $x_j$ is performed by applying the fast Hadamard transformation, resulting in correlation vector w'.

The a-priori information for the systematic bits of the Walsh functions is likewise made available to the decoder, if present, as L-values in vector L(u); as a result, the decoder supplies the L-values for the estimated symbols L(û). The amount $|L(\hat{u}_K)|$ indicates the reliability of the decision; the operational sign $(L(\hat{u}_K))$ represents the hard decision. The decoder result for bit $\hat{u}_K$ can be made up of three terms, as expressed by the following equation [4]:

1. the a-priori information $L(u_k)$ about the bit to be decoded;
2. the channel information $L_c \cdot y_{sys(k)}$ about the bit to be decoded, as well as of
3. the so-called extrinsic information $L_e(\hat{u}k)$, in which the channel information and a-priori information on all other bits of vector y or of the transmitted Walsh function are summarized.

$$L(\hat{u}_k) = L(u_k) + L_c \cdot y_{sys(k)} + L_e(\hat{u}_k) \quad [4]$$

Since the decoder, assuming the receiving vector y with the reliability $L_e$ and the a-priori vector L(u), supplies the weighted decision $L(\hat{u}_k)$ as the decoder result for the considered symbol, the extrinsic term $L_e(\hat{u}_k)$ is able to be calculated, so to speak, as a further decoder result.

Figure 3:
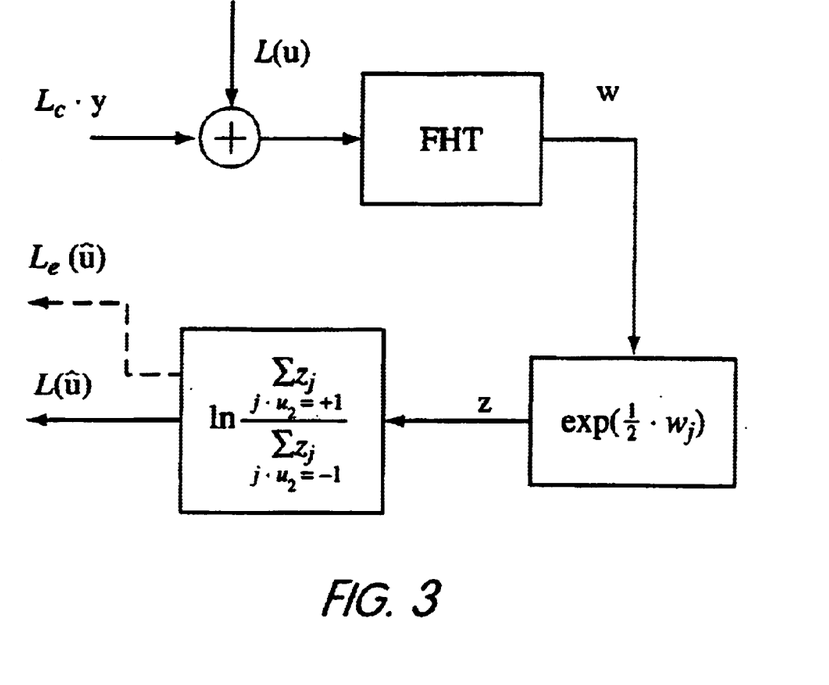
FIG. 3 shows a block diagram of a decoder structure for the inner Hadamard code.

FIG. 3 depicts a decoder structure for the inner Hadamard code. With the aid of the fast Hadamard transformation, the decoding can be carried out at this point, as expressed by the equation $$L(\hat{u}_k) = \ln \frac{\sum_{j=0, uk=+1}^{N-1} \exp\left(\sum_{i=0}^{N-1} L(x_i; y_i) \cdot \frac{1}{2} x_i\right)}{\sum_{j=0, uk=-1}^{N-1} \exp\left(\sum_{i=0}^{N-1} L(x_i; y_i) \cdot \frac{1}{2} x_i\right)} \quad [5]$$

The notation with the three terms can be directly derived from this, as expressed by equation [4].

$$L(\hat{u}_k) = L(u_k) + L_e y_{sys} + \underbrace{\ln \frac{\sum_{j=0,u_k=+1}^{N-1} \exp\left(\sum_{i=0,i\neq sys(k)}^{N-1} L(x_i; y_i) \cdot \frac{1}{2} x_i\right)}{\sum_{=0,uk=-1}^{N-1} \exp\left(\sum_{i=0,i\neq sys(k}^{N-1} L(x_i; y_i) \cdot \frac{1}{2} x_i\right)}}_{L_e(\hat{u}_k)}$$ [6]

The vector of the a-priori values is added to the vector of the reliability values from the channel. The addition term in equation [5] is available for all Walsh functions $x_j$ according to the fast Hadamard transformation in vector w. After forming the exponential functions with $$\frac{1}{2} \cdot w_j,$$

as an argument, the elements of result vector z must be correctly summed for each symbol $\hat{u}_k$ to be decoded (numerator and denominator in equation [5]). The L-value of the decision is directly available through logarithm formation.

For the case that no a-priori information is available, namely when $L(u_k)=0$, the decoding instruction according to equation [5] does not change. This generally occurs when working with a first-time decoding of receiving vector y, because the coded bits $u_k$ or the symbols of the Walsh functions $x_j$ assume, with the same probability, the values "1" and "−1" and, thus, no a-priori knowledge of the transmitted symbols is available.

In this context, the AWGN (Additive White Gaussian Noise) channel is used as a channel model to represent the simulation results for the decoder structures introduced till now. The parameters of the convolution code, as well as of the orthogonal mapping, correspond to the specifications according to the considered standard IS-95. Even the variable weighting of the maximum likelihood decision of the first decoder has an effect on the overall result.

If only the maximum terms, instead of the entire sum, are used for the numerator and denominator in equation [2], then the approximation MAP equation is reduced to a simple expression, without ln- and exp-functions, that is applied to the FHT output (correlation vector) w':

$$L(\hat{u}_k) \approx \frac{1}{2} \cdot \max_{j,uk=+1} (w'_j) - \frac{1}{2} \cdot \max_{j,uk=-1} (w'_j).$$ [7]

The use of only the maximum of the values in the numerator, as well as of the maximum of the values in the denominator, is expressed as:

$$\ln \frac{\sum_{j,u_k=+1}^{N-1} Z_j}{\sum_{j,u_k=-1}^{N-1} Z_j} = \ln \frac{\sum_{j,u_k=+1}^{N-1} \exp\left(\frac{1}{2} w_j\right)}{\sum_{j,u_k=-1}^{N-1} \exp\left(\frac{1}{2} w_j\right)}$$ [8]

$$= \ln\underbrace{\left(\sum_{j,u_k=+1}^{N-1} \exp\left(\frac{1}{2}w_j\right)\right)}_{\text{Term 1}} - \ln\underbrace{\left(\sum_{j,u_k=-1}^{N-1} \exp\left(\frac{1}{2}w_j\right)\right)}_{\text{Term 2}}$$

$$\approx \ln\left(\max_{j,u_k=+1}\left[\exp\left(\frac{1}{2}w_j\right)\right]\right) - \ln\left(\max_{j,u_k=-1}\left[\exp\left(\frac{1}{2}w_j\right)\right]\right)$$ [9]

$$= \frac{1}{2} \max_{j,u_k=+1}[w_j] - \frac{1}{2} \max_{j,u_k=-1}[w_j]$$

This clearly reduces computational outlay.

An approximation may also be given for the application in each case of the two largest values. For term 1 of equation [8], it is expressed by $$w_{m1} = \max_{j, u_k=+1}[w_j],$$

as well as by $w_{m2}$ as the second largest value of the considered $w_j$:

$$\ln\left(\sum_{j,u_k=+1}^{N-1} \exp\left(\frac{1}{2}w_j\right)\right) \approx \ln\left(\exp\left(\frac{1}{2}w_{m1}\right) + \exp\left(\frac{1}{2}w_{m2}\right)\right)$$ [10]

$$= \ln\left(\sum_{j,u_k=+1}^{N-1} \exp\left(\frac{1}{2}w_j\right)\right)$$

$$\approx \ln\left(\exp\left(\frac{1}{2}w_{m1}\right) + \exp\left(\frac{1}{2}w_{m2}\right)\right)$$

$$= \ln\left(\exp\left(\frac{1}{2}w_{m1}\right) \cdot \left(1 + \exp\left(\frac{1}{2}(w_{m2} - w_{m1})\right)\right)\right)$$

$$= \ln\left(\exp\left(\frac{1}{2}w_{m1}\right)\right) + \ln\left(1 + \exp\left(-\frac{1}{2}(w_{m1} - w_{m2})\right)\right)$$

$$\approx \frac{1}{2}w_{m1} + \varepsilon$$

where:

$$\varepsilon = \begin{cases} 0, & \text{for } W_{m1} - W_{m2} \geq 4\ln 2 \\ \ln 2 - \frac{1}{4}(W_{m1} - Wm2), & \text{for } 0 \leq W_{m1} - W_{m2} < 4\ln 2 \end{cases}$$ [11]

Figure 4:
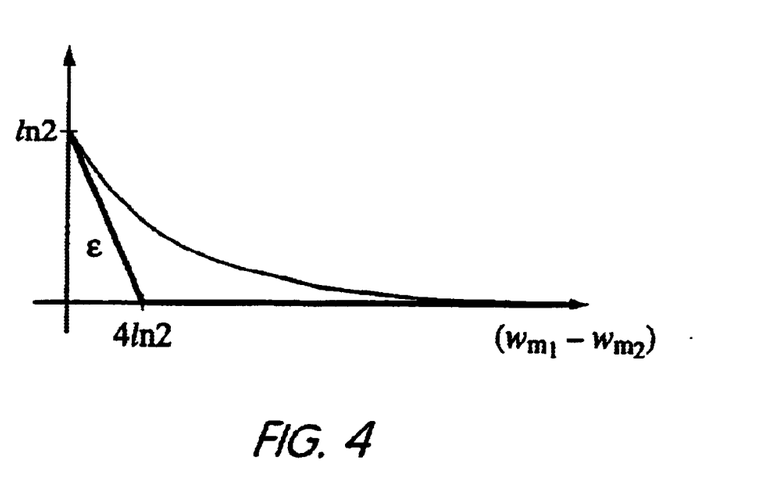
FIG. 4 shows a graph for clarifying the approximation for ε.

In FIG. 4, the clarification of the approximation is represented for ε. One obtains an analogous result for term 2 in equation [8].

To obtain the a-priori information in equation [2], the outer code $C^0$ is to be decoded. The conventional Viterbi decoder supplies only hard-decision values for the transmitted information bits, which is why it is replaced by a soft-decision Viterbi algorithm (SOVA), which is modified in such a way that the reconstruction is not carried out for the information bits, but rather for the coded bits of the outer code (CODSOVA).

Figure 5:
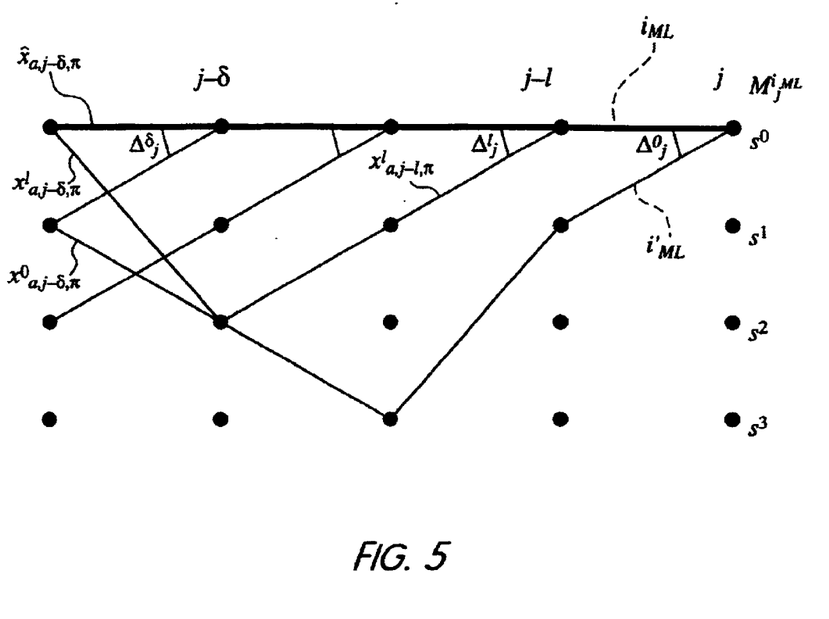
FIG. 5 shows a Trellis diagram with rejected paths along the maximum likelihood path.

At each instant j, a Viterbi decoder makes a decision about the information bit $v_j-\delta$ that is preceding [took place previously] by the decision depth δ, on the basis of the maximum likelihood path, denoted $i_{ML}$, reference being made in this regard to FIG. 5, which shows a Trellis diagram with rejected paths along the maximum likelihood path.

The decision depth δ is to be so calculated, that one can start out from the assumption that all surviving paths in the Trellis diagram at this cycling instant run together, forming one path. The rule of thumb in this context is that δ is to be selected to be more or less five times as great as memory length m of the coder—however, not as in the example of FIG. 11.

The maximum likelihood path $i_{ML}$ at the cycling instant j is determined by the largest state metrics $$\max_v \{M_j^v\}$$

of all states $s^v$, where $v=0, \ldots, 2^m-1$.

The state metrics are calculated in that, initially, for each of the two possible transitions (binary Trellis) into state $$s_j^v,$$

the current, or active branch metrics—this corresponds to the correlation value of the symbols to be decoded having the code bits of this state transition—is added to the state metrics of the previous state $$s_{j-1}^v$$

in question. Of the two metrics values obtained in the process, the larger is selected; the other path is rejected.

Without a-priori information about the coded bits, for one binary convolution code of the rate 1/N, the accumulated path metrics of path i at instant j is calculated as:

$$M_j^i = M_{j-1}^i + \sum_{n=0}^{n-1} Xa, j, n \cdot L(\hat{u}j, n) \quad [12]$$

Index i (i=0, ..., $2 \cdot 2^m-1$) denotes in this case all possible paths into states $$s_j^v,$$

starting out from the $2^m$ winner paths of the $2^m$ previous states $$s_{j-1}^v.$$

Since N coded bits were produced per coding section N, for every metrics calculation according to equation (8.17), N input values must be correlated to N coded bits in conformance with the state transition under consideration. The values $L(\hat{u}_{j,n})$, where n=0, ..., N-1 correspond directly to the reliability values of the decoder result of the previous step.

To clarify the relations, a Trellis diagram having only four states is considered by way of example in FIG. 5. At instant j, the zero path—the thicker line—is the maximum likelihood path $i_{ML}$. The loser paths along this ML path are likewise drawn in.

If, as shown in FIG. 5

$$M_j^{iML}$$

the largest metrics of all states, then a difference in the metrics of this winner path $i_{ML}$ as compared to the loser path $i_{ML}$ in this state, is able to be defined:

$$\Delta_j^0 = \frac{1}{2}(M_j^{iML} - (M_j^{i'ML}). \quad [13]$$

In this context, the superscripted index 0 denotes that this is the metrics difference at position j–0 of the ML path. The probability indicating that this path decision is correct is calculated as:

$$P(i_{ML} \text{ is right}) = \frac{\exp(M_j^{iML}/2)}{\exp(M_j^{iML}/2) + \exp(M_j^{iML}/2)} \quad [14]$$

$$= \frac{\exp(\Delta_j^0)}{1 + \exp(\Delta_j^0)}.$$

Accordingly, the corresponding L-value is $$L(i_{ML} \text{ is right}) = \ln\frac{P(i_{ML} \text{ is right})}{1 - P(i_{ML} \text{ is right})} = \Delta_j^0. \quad [15]$$

At this point, along path $i_{ML}$ having the largest metrics, δ+1 loser paths are rejected. In this context, as expressed in equation [15], the metrics differences at instants j–δ, . . . j indicate the reliability of the path decisions in question.

With the aid of these metrics differences, the reliability can be calculated for the information bit $L(v_j-δ)$ decided upon. It is checked in this context for all decisions along the ML path whether a rejected path would have decided differently for information bit $v_j-δ$ than the ML path.

When working with the soft-output Viterbi algorithm for the coded bits (COD-SOVA), an analogous procedure is used, in turn, starting from the path having maximum metrics and metric differences, to specify reliability information for the coded bits $L(\hat{x}a,j-d,n)$, n=0, . . . , N-1 of the state transition decided upon.

For this, it is checked for each rejected path l along the maximum likelihood path, whether the decisions $x^l_{a,j-δ,n}$, that this loser path would have made for the coded bits deviate from the decisions of the winner path. If this is the case, the probability for a correct decision $e^l_{j-d,n}=1$ on the basis of this path decision l can be defined as a function of the metrics difference $\Delta^1_j$:

$$P(e_{j-δ,n}^1 = 1) = P(i_{ML} \text{ is right}|_{j-1}) = \frac{\exp(\Delta_j^1)}{1 + \exp(\Delta_j^1)} \quad [16]$$

Thus, on the basis of the path decision at j−1, the L-value for the coded bit amounts to:

$$L(e^l_{j-\delta,n}) = \begin{cases} +\Delta^l_j & x^l_{a,j-\delta,n} \neq \hat{x}_{a,j-\delta,n} \quad n=0,\ldots N-1 \\ +\infty & x^l_{a,j-\delta,n} = \hat{x}_{a,j-\delta,n} \quad n=0,\ldots N-1 \end{cases} \quad [17]$$

In response to equation [17], the reliability value is very high, and is set to +∞. If there is a difference, then the reliability of the decision is a function of the metrics difference at instant j−1. If the path decision was very certain, given a large metrics difference, then the reliability is also quite high, in spite of different decisions of the winner and loser path. If, however, the decision was uncertain, thus the metrics difference was only somewhat greater than zero, then the reliability of this decision is likewise poor, due to different statements for the code bit being considered. The reliability of the decision made on the basis of all rejected paths, is expressed as $$L(\hat{x}_{a,j-\delta,n}) = \hat{x}_{a,j-\delta,n} \cdot \sum_{i=0}^{\delta} L(e'_{j-\delta,n}). \quad [18]$$

The so-called "box plus" sum sign in equation [18] signifies that of all decision variables which influence the reliability of $L(\hat{x}_{a,j-\delta,n})$, the least reliable one is the one that is decisive.

If all reliability values of the decision for $\hat{x}_{a,j-\delta,1}$ were greater, for example, than 1.5, and merely one L-value ($e^1_{j-\delta,1}$) were=1.5 in accordance with the metrics difference at j−1, then the decision for the code bit would be weighted accordingly with $L(\hat{x}_{a,j-\delta,1}=+1)=1.5$.

Thus, in its simplest terms, equation [18] is expressed as:

$$L(\hat{x}_{a,j-\delta,n}) = \hat{x}_{a,j-\delta,n} \cdot \min_{i=0,\ldots\delta} L(e^l_{j-\delta,n}) \quad n=0,\ldots,N-1 \quad [19]$$

This soft output $L(\hat{x}_{a,j-\delta,n})$ where n=0, ... N−1 or generally $L(\hat{x}_a)$ for the coded bits of the outer convolution code is now used as a-priori information L(u) for the renewed decoding of the inner code.

As an alternative to the CODSOVA, a complete MAP decoder can be used. The soft information pertaining to the calculations of the outer, coded bits is used partially as a-priori information L'(u) for the systematic bits of the inner code, which are fed back; thus, a simple feeding back of the soft values to the first decoder takes place. To avoid statistical dependencies between the soft values of the various iteration steps, it is only necessary, as shown in FIG. 2, for the extrinsic information $$L^o_e(\hat{u})$$

as shown in FIG. 2, to be fed back. The system parameters for all simulations are selected in conformance with the IS-95 standard.

Figure 6:
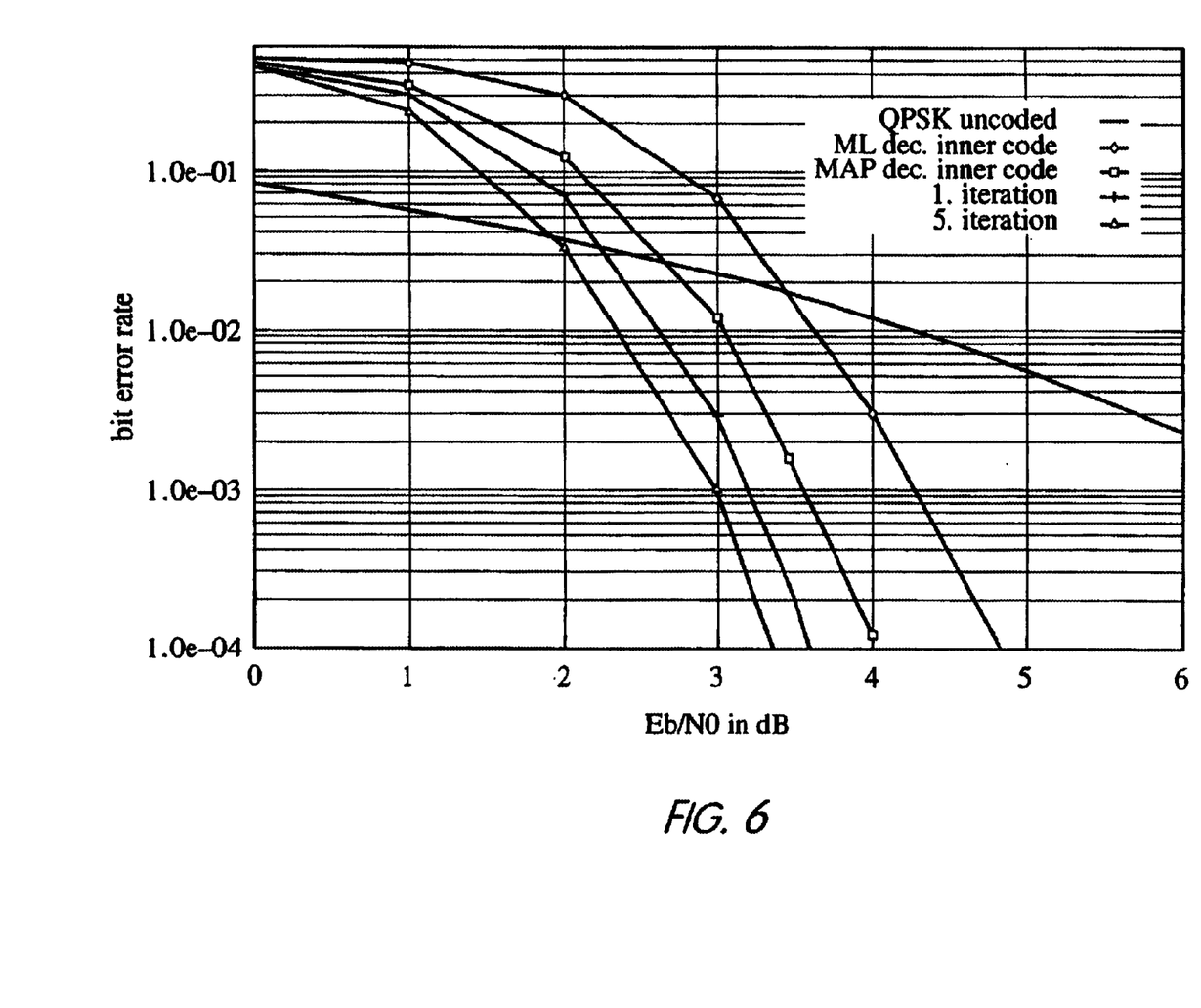
FIG. 6 shows a graph of the simulation results for the coherent RAKE receiver.
Figure 7:
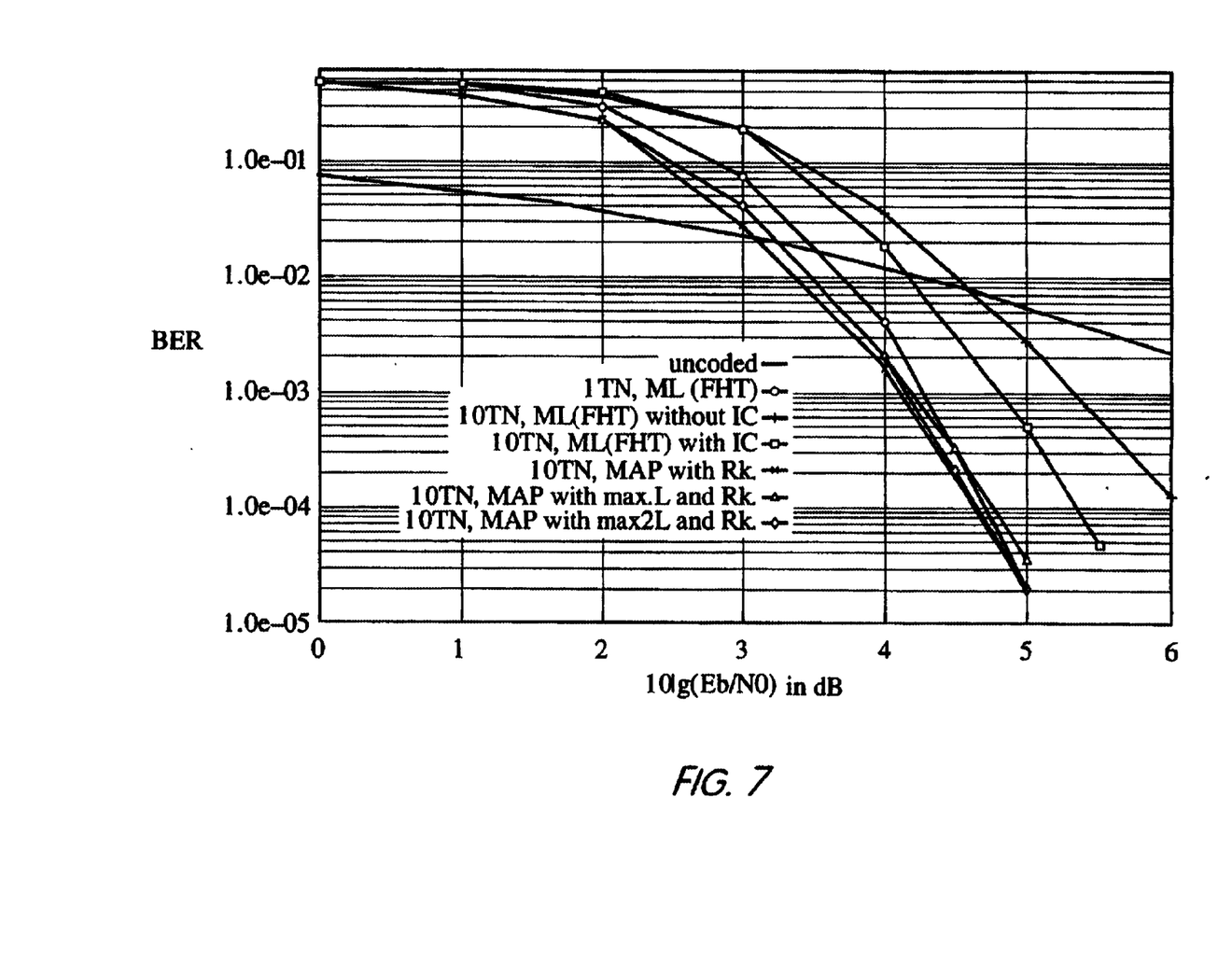
FIG. 7 shows a graph of a comparison of the IC to a system having MAP decoding with use of the simplification, Additive White Gaussian Noise (AWGN), U=10, J$_{ges}$=128.
Figure 8:
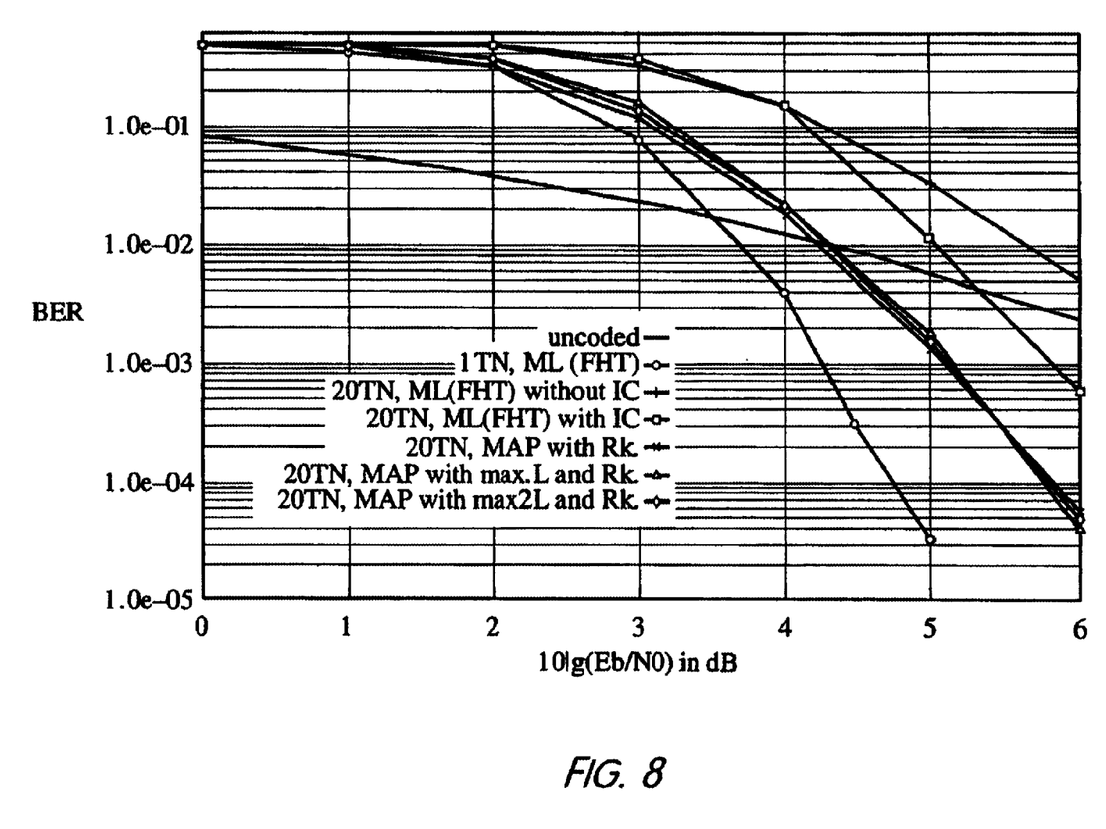
FIG. 8 shows a comparison of the IC to a system having MAP decoding with use of the simplification, AWGN, U=20, J$_{ges}$=128.
Figure 9:
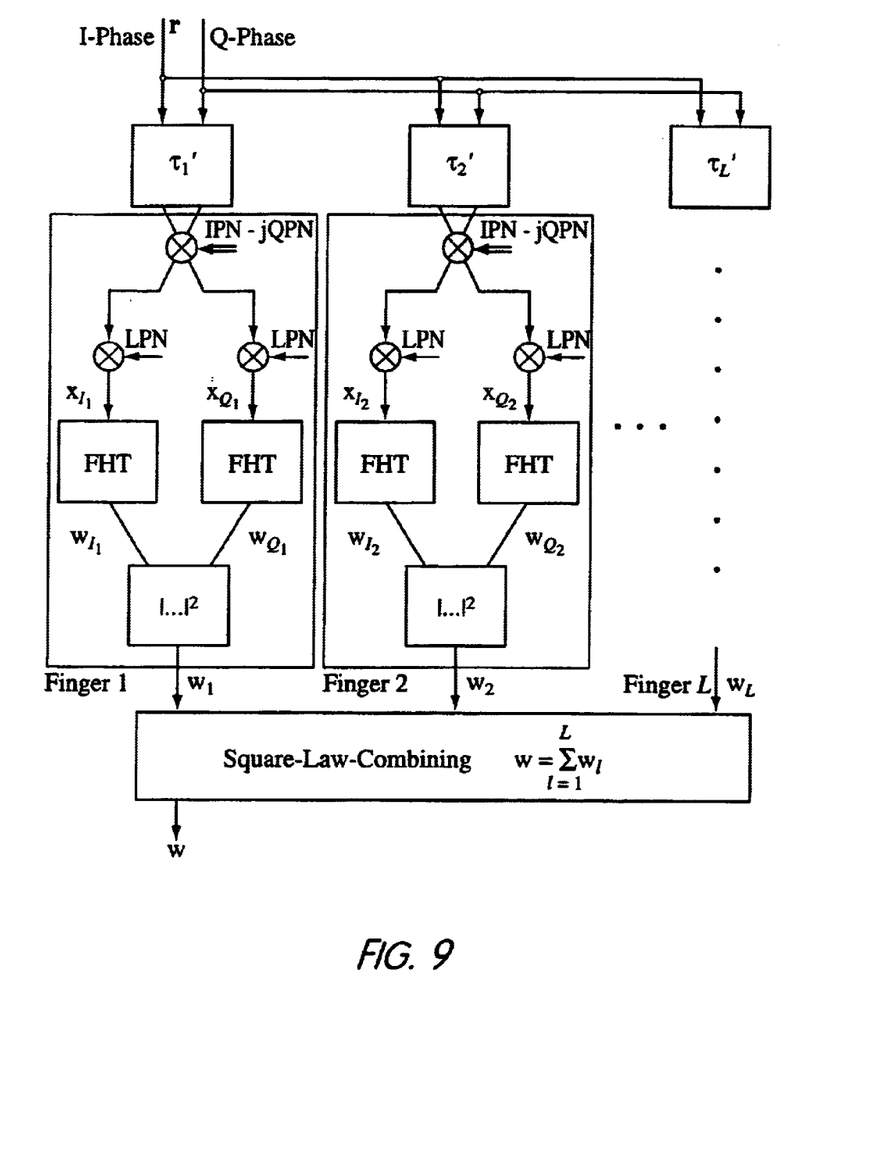
FIG. 9 shows a block diagram representation of the decoder structure of a non-coherent RAKE receiver having SLC.
Figure 10:
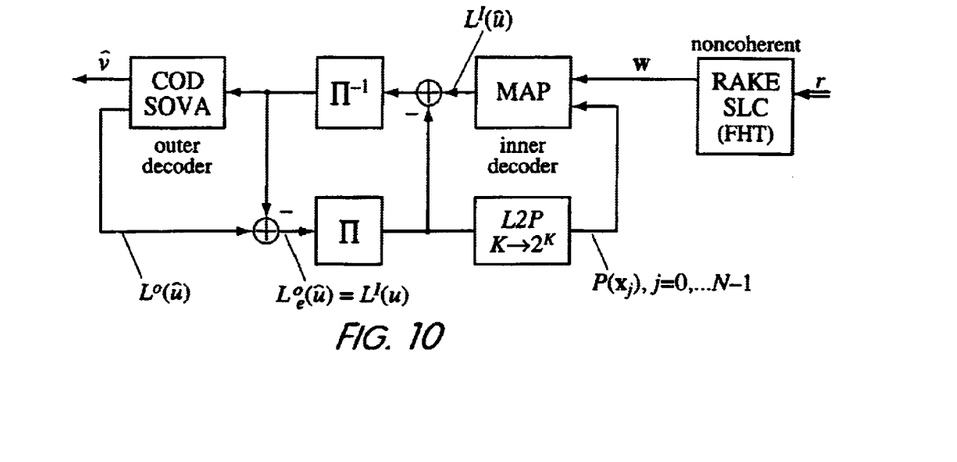
FIG. 10 shows a block diagram representation of the iterative decoding in the non-coherent receiver.

The simulation results for the AWGN channel are reproduced as a channel model in FIG. 6, which shows the simulation results for the coherent RAKE receiver. Noticeable is the gain of 0.7 dB in $E_b/N_0$ in response to the bit error rate (BER) of $10^{-3}$, when the ML decoder is replaced for the inner code by the MAP decoder according to equation [2]. Moreover, using the iterative decoding, a total gain of 1.3 dB can be achieved after five iterations. When the simple approximation is applied in equation [7], then the resulting degradation amounts to less than 0.1 dB.

The following will explain the case for MAP and iterative decoding in the non-coherent receiver.

The principal reason for using the M-fold orthogonal modulation is the possibility of demodulating the received signal without phase information. Let us assume that one starts out only from the knowledge of the delays of the multi-path channel and the iterative decoding in a non-coherent receiver having square-law combining (SLC) of the individual elements, determined according to the following FIG. 11, which illustrates a non-coherent RAKE receiver having SLC.

In each of the L-RAKE fingers, the quadrature descrambling IPN-jQPN, the direct-sequence elimination of spreading LPN and the FHT must be performed for the in- and quadrature-phase components following compensation of the path delay. After that, the 2L correlation vectors are square-law combined, to form the decision vector w. When, in turn, a Gaussian distortion is assumed on the receiver chip for the filter outputs, then the resultant probability density function of the vector element $w_j$ is (not-) centrally chi-square distributed with 2L degrees of freedom. Under the condition that the Walsh function $x_i$ has been transmitted, then one obtains the conditional probability $$p(w_j \backslash x_j) = p_n(w_j) = \frac{1}{2\sigma^2}\left(\frac{w_j}{s^2}\right)^{\frac{L-1}{2}} \exp\left(-\frac{w_j + s^2}{2\sigma^2}\right) \cdot I_{L-1}\left(\sqrt{w_j} \cdot \frac{s}{\sigma^2}\right) \quad [20]$$
for $j=1$ $$p_c(w_j) = \frac{1}{2^L \sigma^{2L}(L-1)!} \cdot w_j^{L-1} \cdot \exp\left(\frac{-w_j}{2\sigma^2}\right) \quad [21]$$
for $j \neq i$.

The non-centrality $s^2$ and the average noise power $\sigma^2$ per random variable of the decision vector w can be estimated. The modified Bessel function $\sigma^2$ of the first type and order L−1 is characterized by $I_{L-1}(.)$. For the iterative decoding, the decoder equation must be expanded so as to permit a-priori information about the systematic bits of the code word $x_j$ (j=0, ..., N−1) to be used. Therefore, one begins with the Bayes law and analyzes the probability $P(x_j|w)$, which results from the observation of w:

$$P(x_j | w) = \frac{P(x_j) \cdot p(w | x_j)}{p(w)} \quad [22]$$

The probability density functions used in equation [22] can be expressed as follows:

$$p(w | x_j) = p_c(w_0) \cdot \ldots \cdot p_n(w_1) \cdot \ldots \cdot p_c(w_{N-1}) = \frac{p_n(w_j)}{p_c(w_j)} \cdot \prod_{i=0}^{N-1} p_c(w_i) \quad [23]$$

and $$p(w) = \sum_{j=0}^{N-1} P(x_j) \cdot p(w \mid x_j) \quad [24]$$

Here, there is no limitation to the a-priori probabilities for all Walsh functions having the condition:

$$\sum_{j=o}^{N-1} P(Xj) = 1 \text{ or } P(Xj) = \frac{1}{N} \quad [25]$$

By substituting equations [23] and [24] in equation [22], one can then analyze the maximum a-posteriori probability for all Walsh functions, observing w:

$$P(x_j \mid w) = P(x_j) \cdot \frac{p_n(w_j)}{p_c(w_j)} \cdot \alpha \quad [26]$$

Constant α is independent of j. For the decoder rule, it is necessary to analyze the maximum a-posteriori probabilities for the K systematic bits:

$$P(\hat{\mu}_k = +1 \mid w) = \sum_{x \in C^t, \mu_k = +1} P(x \mid x) \quad [27]$$

$$= \alpha \sum_{j=o, \mu_k = +1}^{N-1} P(x_j) \cdot \frac{p_n(w_j)}{p_c(w_j)}$$

In the final decoder equation, which provides a logarithm likelihood relation for the desired bit, α disappears:

$$L^I(\hat{\mu}_k) = \ln \frac{P(\hat{\mu}_k = +1 \mid w)}{P(\hat{\mu}_k = -1 \mid w)} \quad [28]$$

$$= \ln \frac{\sum_{j=o, \mu_k=+1}^{N-1} P(x_j) \cdot w_i^{\frac{L-1}{2}} \cdot I_{L-1}\left(\sqrt{w_j} \frac{s}{\sigma^2}\right)}{\sum_{j=o, \mu_k=-1}^{N-1} P(x_j) \cdot w_i^{\frac{L-1}{2}} \cdot I_{L-1}\left(\sqrt{w_j} \frac{s}{\sigma^2}\right)}$$

In equation [28], it is not possible to directly use the K L-values, which are associated with the systematic bits of a Walsh function, that had been obtained by the outer decoder step. As shown in this regard in FIG. 12, with respect to the non-coherent, iteratively decoding receiver, the L-values for all code words must be converted to $N=2^K$ a-priori probabilities $P(x_j)$. As in the preceding section, an approximation can be given for the right term in equation [28], in the consideration of only the maximum summands. A further simplification is possible when the Bessel function is approximated by an exponential function.

Figure 11:
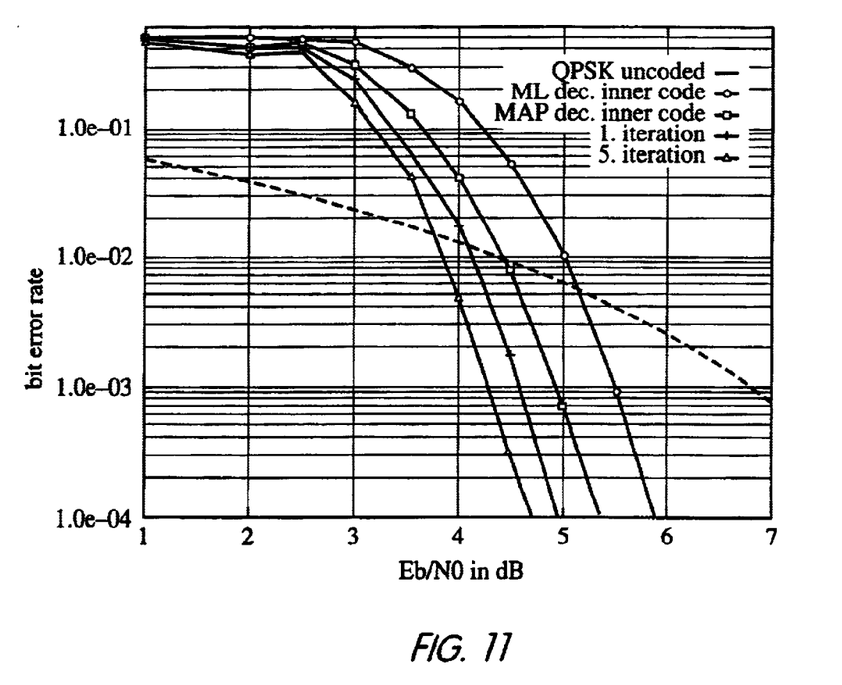
FIG. 11 shows a graphical representation of the simulation results for the non-coherent RAKE receiver.

In FIG. 11, the simulation results are shown for the non-coherent RAKE receiver, AWGN channel, which show a gain of 0.6 dB (BER=$10^{-3}$) when replacing the ML decoder for the inner code by a MAP decoder. When the iterative decoding is used, a total gain of over 1.2 dB can be achieved after five iterations.

Figure 12:
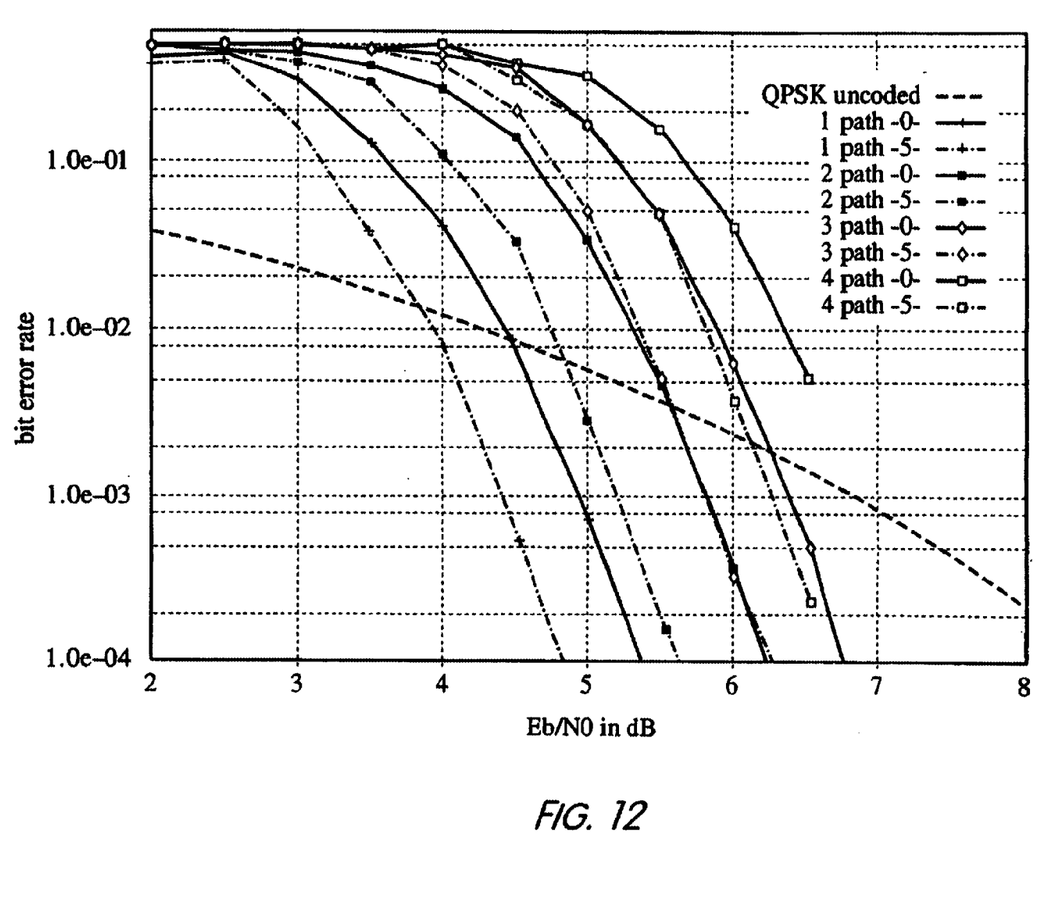
FIG. 12 shows a graphical representation of the simulation results for the non-coherent RAKE receiver having a plurality of statistical multi-path channels and MAP decoding without (-0-) and after the fifth iteration (-5-).

Shown in FIG. 12 are further simulation results for static multi-path channels, which represent the simulation results for the non-coherent RAKE receivers having a plurality of static multi-path channels and MAP decoding without (-0-), and after five iterations (-5-). Here, the MAP decoder algorithm was used as an outer decoder. The number of RAKE fingers varies from 1 to 4 in conformance with the number of paths of the channel. The energy on the paths was uniformly distributed. Consequently, FIG. 11 shows the resulting BER after the first decoding and following five iterations. The degradation of 1 to 4 paths is caused by the addition of the squares of the individual values (square-law combining). From 1 to 2 RAKE fingers, there is a combined loss of over 1 dB, which is nearly independent of the energy distribution on the channel paths. From 2 to 3, and from 3 to 4 paths, the loss amounts to roughly 0.6 dB. The gain attained when working only with iterative decoding, amounts each time to approximately 0.6 dB (BER=$10^{-3}$).

The subject matter of the present invention has industrial applicability in information and communication technology, as a result of optimal decoder rules being made available, with the use of M-fold orthogonal modulation as an inner code. This modulation scheme, in combination with an outer code, can be used in a CDMA system for performing iterative decoding. The MAP decoder rules and their approximations take a-prior information into consideration, which is why they can be applied to other systems having an additional outer FEC code, "turbo-, single-parity check" or other block codes.

What is claimed is:

1. A decoding method for demodulating a received signal available in serial code concatenation in a code-division multiple access transmission system, a two-step coding being carried out at the transmitting end of the transmission system, the method comprising:

providing a soft-in/soft-out decoder in a receiver of the transmission system, a first decoder step of the soft-in/soft-out decoder including an inner decoder and a Hadamard orthogonal multi-step inner code, a second decoder step of the soft-in/soft-out decoder including an outer decoder and an outer error correcting code of a predefined rate; and processing soft values as reliability information at an output and an input of the soft-in/soft-out decoder, a soft output of the inner decoder being a soft input for the outer decoder, a channel reliability information output from a preceding demodulation being an input for the inner decoder;

wherein one of the following is satisfied:

(1) a modified soft-decision Viterbi algorithm is used in which reconstruction is performed for coded bits of the outer code, and is not performed for transmitted information bits; and (2) a maximum a posteriori decoder is used, in which soft information pertaining to calculations of the outer, coded bits is used partially as a priori information for systematic bits of the inner code, so that soft values are fed back to the first decoder;

wherein using logarithmic likelihood algebra, a maximum a posteriori (MAP) decoder for the inner code is expressed by the following first equation:

$$L^I(\hat{u}k) = \ln\frac{\sum_{x \in C^I, uk=+1} P(x \mid y)}{\sum_{x \in C^I, uk=-1} P(\mid y)}$$

$$= \ln\frac{\sum_{x \in C^I, uk=+1} \exp\left(\frac{1}{2}\sum_{i=0}^{N-1} L(x_i; y_i) \cdot x_i\right)}{\sum_{x \in C^I, uk=-1} \exp\left(\frac{1}{2}\sum_{i=0}^{N-1} L(x_i; y_i) \cdot x_i\right)},$$

where the values satisfy the following second equation:

$$L(xi, yi) = \begin{cases} Le \cdot y_i + L^I(Ui); & \text{for } i = \frac{1}{2^{k+1}}N; k = 0, \ldots, K-1 \\ Le \cdot y; & \text{otherwise} \end{cases}$$

describe a probability of all elements of the resulting vector, $x_i$ and $y_i$, being Walsh functions, x and y being a vector, C being a code, $U_i$ being a bit.

2. The method as recited in claim 1, wherein the probability is supplemented by an input vector y with probability $L_c$ by a-priori information $L^I(u_i)$ for systematic bits according to the first equation of a code word, wherein the arguments of the exponential function in the second equation are results of correlating a resulting vector with all Walsh functions $x_j$, j=0, ..., N−1, the correlation operation for all code words $x_j$ being performed by applying a fast Hadamard transformation to provide a correlation vector $w^1$.

3. A decoding device for demodulating a received signal available in serial code concatenation in a code-division multiple access transmission system, a two-step coding being carried out at the transmitting end of the transmission system, the device comprising:

a soft-in/soft-out decoder disposed in a receiver of the transmission system, a first decoder step of the soft-in/soft-out decoder including an inner decoder and a Hadamard orthogonal multi-step inner code, a second decoder step of the soft-in/soft-out decoder including an outer decoder and an outer error-correctinge code of a predefined rate, soft values being processed as reliability information at an output and an input of the soft-in/soft-out decoder, a soft output of the inner decoder being a soft input for the outer decoder, a channel reliability information output from a preceding demodulation being an input for the inner decoder;

wherein one of the following is satisfied:
(1) a modified soft-decision Viterbi algorithm is used in which reconstruction is performed for coded bits of the outer code, and is not performed for transmitted information bits; and
(2) a maximum a posteriori decoder is used, in which soft information pertaining to calculations of the outer, coded bits is used partially as a priori information for systematic bits of the inner code, so that soft values are fed back to the first decoder, wherein using logarithmic likelihood algebra, a maximum a posteriori (MAP) decoder for the inner code is expressed by the following first equation:

$$L^I(\hat{u}k) = \ln\frac{\sum_{x \in C^I, uk=+1} P(x \mid y)}{\sum_{x \in C^I, uk=-1} P(\mid y)}$$

$$= \ln\frac{\sum_{x \in C^I, uk=+1} \exp\left(\frac{1}{2}\sum_{i=0}^{N-1} L(x_i; y_i) \cdot x_i\right)}{\sum_{x \in C^I, uk=-1} \exp\left(\frac{1}{2}\sum_{i=0}^{N-1} L(x_i; y_i) \cdot x_i\right)},$$

where the values satisfy the following second equation:

$$L(xi, yi) = \begin{cases} Le \cdot y_i + L^I(Ui); & \text{for } i = \frac{1}{2^{k+1}}N; k = 0, \ldots, K-1 \\ Le \cdot y; & \text{otherwise} \end{cases}$$

describe a probability of all elements of the resulting vector, $x_i$ and $y_i$ being Walsh functions, x and y being a vector, C being a code, $U_i$ being a bit.

4. The device as recited in claim 3, wherein the probability is supplemented by an input vector y with probability $L_c$ by a-priori information $L^I(ui)$ for systematic bits according to the first equation of a code word, wherein the arguments of the exponential function in the second equation are results of correlating a resulting vector with all Walsh functions $x_j$, j=0, ..., N−1, the correlation operation for all code words $x_j$ being performed by applying a fast Hadamard transformation to provide a correlation vector $w^1$.

* * * * *